(12) United States Patent  
Ducaste et al.

(10) Patent No.: US 12,532,145 B2  
(45) Date of Patent: Jan. 20, 2026

(54) SCANNABLE ID INFORMATION BRACELET PASS

(71) Applicants: Rose Ducaste, Whitman, ME (US); Henry Guerrero, Whitman, ME (US); Ludiane Ducena, Whitman, ME (US); Steeve R. Ducena, Whitman, ME (US)

(72) Inventors: Rose Ducaste, Whitman, ME (US); Henry Guerrero, Whitman, ME (US); Ludiane Ducena, Whitman, ME (US); Steeve R. Ducena, Whitman, ME (US)

( * ) Notice: Subject to any disclaimer, the term of this patent is extended or adjusted under 35 U.S.C. 154(b) by 399 days.

(21) Appl. No.: 17/727,696

(22) Filed: Apr. 22, 2022

(65) Prior Publication Data

US 2023/0345201 A1 Oct. 26, 2023

(51) Int. Cl.
| | |
|---|---|
| *H04W 4/02* | (2018.01) |
| *G06K 19/06* | (2006.01) |
| *G06K 19/07* | (2006.01) |
| *G08B 7/00* | (2006.01) |
| *G16H 10/60* | (2018.01) |

(52) U.S. Cl.
CPC ...... *H04W 4/023* (2013.01); *G06K 19/06037* (2013.01); *G06K 19/0723* (2013.01); *G08B 7/00* (2013.01); *G16H 10/60* (2018.01)

(58) Field of Classification Search
None
See application file for complete search history.

(56) References Cited

U.S. PATENT DOCUMENTS

| | | | |
|---|---|---|---|
| 11,818,628 B2 * | 11/2023 | Housch | H04W 4/029 |
| 2018/0052970 A1 * | 2/2018 | Boss | G06F 21/35 |
| 2022/0133432 A1 * | 5/2022 | Guirguis | G09F 3/0297 |
| | | | 40/633 |
| 2022/0292543 A1 * | 9/2022 | Henderson | G06Q 30/0252 |

* cited by examiner

*Primary Examiner* — Kenneth B Wells
(74) *Attorney, Agent, or Firm* — Lyman Moulton, Esq.; Moulton Patents PLLC

(57) ABSTRACT

The VacID is the only product of its kind that utilizes cutting-edge QR scanning technology to provide proof of both vaccination shots and medical record information through a fashionable wristband. This unprecedented accessory is uniquely designed with durable waterproof materials, can be worn for any occasion with the ability to interchange the bands to fit one's personal style, offering varying fun colors to accommodate all age groups and preferences. Furthermore, this avant-garde bracelet is carefully crafted with a technologically advanced touch screen that scrolls to retrieve categorically organized medical information in effort to ensure that no unwanted information pops-up in the act of browsing for specific data; ultimately, providing a user-friendly interface.

16 Claims, 6 Drawing Sheets

SCANNABLE ID INFORMATION BRACELET PASS

BACKGROUND

Losing, forgetting, and damaging a vaccine card has become a highly likely situation this year with COVID-19, and as mandates progress across the globe, paper tracking complicates the act of showcasing proof that an individual is actually fully vaccinated. Those without proof of the COVID-19 vaccination, in specific, may increasingly find themselves denied entry to places such as airports, restaurants, gyms, and entertainment venues which creates an inconvenient and frustrating situation with respect to managing a population based on their inoculation status. There have been no products available as original equipment or as an aftermarket to address this problem.

An apparatus that easily and effectively holds your vital information for proof of identification, pertinent information you need to share with medical professionals, or those requiring certain information to receive entity to an event or other places with restriction of entry is not being met by any known device or system at present. There have been no products available as original equipment or as an aftermarket to address this problem either.

SUMMARY OF THE INVENTION

The main purpose of the scannable ID information bracelet pass is to provide users with a multi-functional hypoallergenic rubber bracelet that stores medical status and medical immunizations, via a QR scanner, to facilitate providing proof of vaccination.

Figure 1:
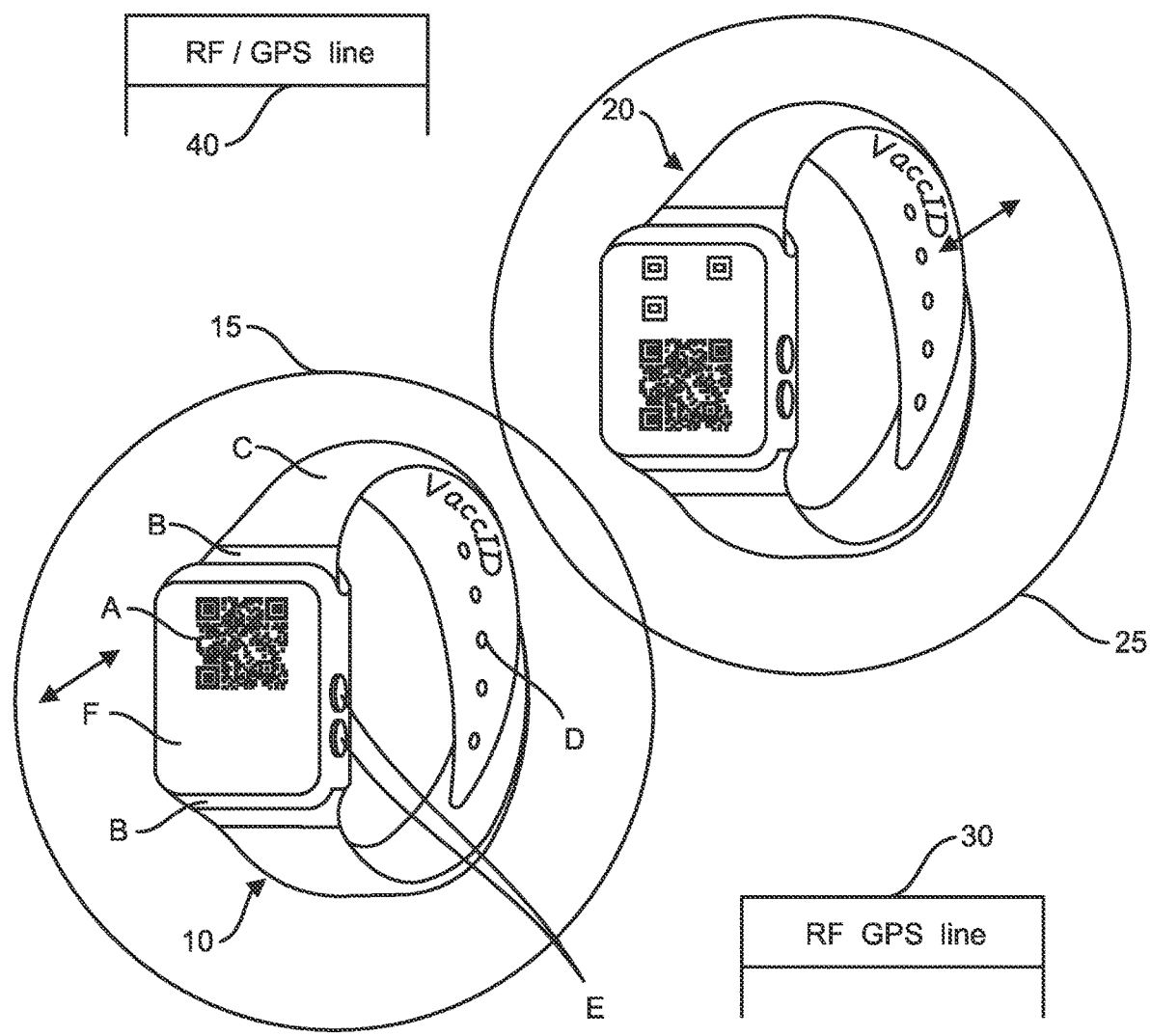
FIG. 1 is a front perspective view of two scannable ID information bracelets in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a front perspective view of two scannable ID information bracelet pass showing: QR code (vaccine info) referenced as A, magnet attachment referenced as B, durable interchangeable adjustable band referenced as C, snap to close band referenced as D, scroll buttons referenced as E, and touch screen referenced as F, in accordance with an embodiment of the present disclosure. The view also includes the first bracelet 10, a second bracelet 20, a first proximity 15 and a second proximity 25. The first RF radio frequency and GPS global positioning satellite boundary or line 40 and the second RF and GPS boundary or line 25 are included. Interaction of the boundaries is shown where overlap thereof occurs.

The present disclosed scannable medical ID and health bracelet, also known as the "VacID" offers a modern accessory that enables users to digitally store their vaccination and medical records into a sleek bracelet to ensure they can provide quick and accurate evidence of vaccination status, at any and all times. Expanding on the initial design of an average bracelet, the VacID introduces a novel, highly-advanced, wristband with QR code scanning capabilities. Once an individual is fully vaccinated, the bracelet will scan and register with that unique code belonging to the patient. Upon set-up, it must be programmed by medical personnel auditing the person by picture ID and birthday confirmation, to reflect Vaccinations Status on all up-to-date vaccinations, including but not limited to: COVID-19, Influenza, Measles, Polio, Pneumococcal, Hepatitis and much more, based on medical needs. Once the VacID is programmed, one can easily retrieve from the bracelet official vaccination status by the simple act of scanning the front facing QR code. To further enhance functionality, the VacID can also be used to store other medical records, to guarantee that in the case of any medical emergency, individuals can access crucial data for immediate care, such as: heart rate, blood pressure, medical code status, etc. that may not be a requirement to have at hand, but that can be used in the event of an emergency or personal use. The digital passport is an additional use of VacID by incorporating travel restrictions and regulations to countries that need proof of vaccinations for entry. These restrictions and regulations are linked to VacID via a digital passport for confirming that said vaccinations are in the system and up to date. VacID and the digital passport is a great way to have all correlated travel data and each country requirements together in one place especially since each country's requirements vary. Together it will not only show up to date vaccinations but also necessary up to date destinations requirements. The VacID serves to benefit all individuals who seek to have a more convenient, safe, and simple means of proving their vaccination status.

The VacID is the only product of its kind that utilizes cutting-edge QR scanning technology to provide proof of both vaccination shots and medical record information through a fashionable wristband. This unprecedented accessory is uniquely designed with durable waterproof materials, can be worn for any occasion with the ability to interchange the bands to fit one's personal style, offering varying fun colors to accommodate all age groups and preferences. Furthermore, this avant-garde bracelet is carefully crafted with a technologically advanced touch screen that scrolls to retrieve categorically organized medical information in an effort to ensure that no unwanted information pops-up in the act of browsing for specific data; ultimately, providing a user-friendly interface.

Figure 2:
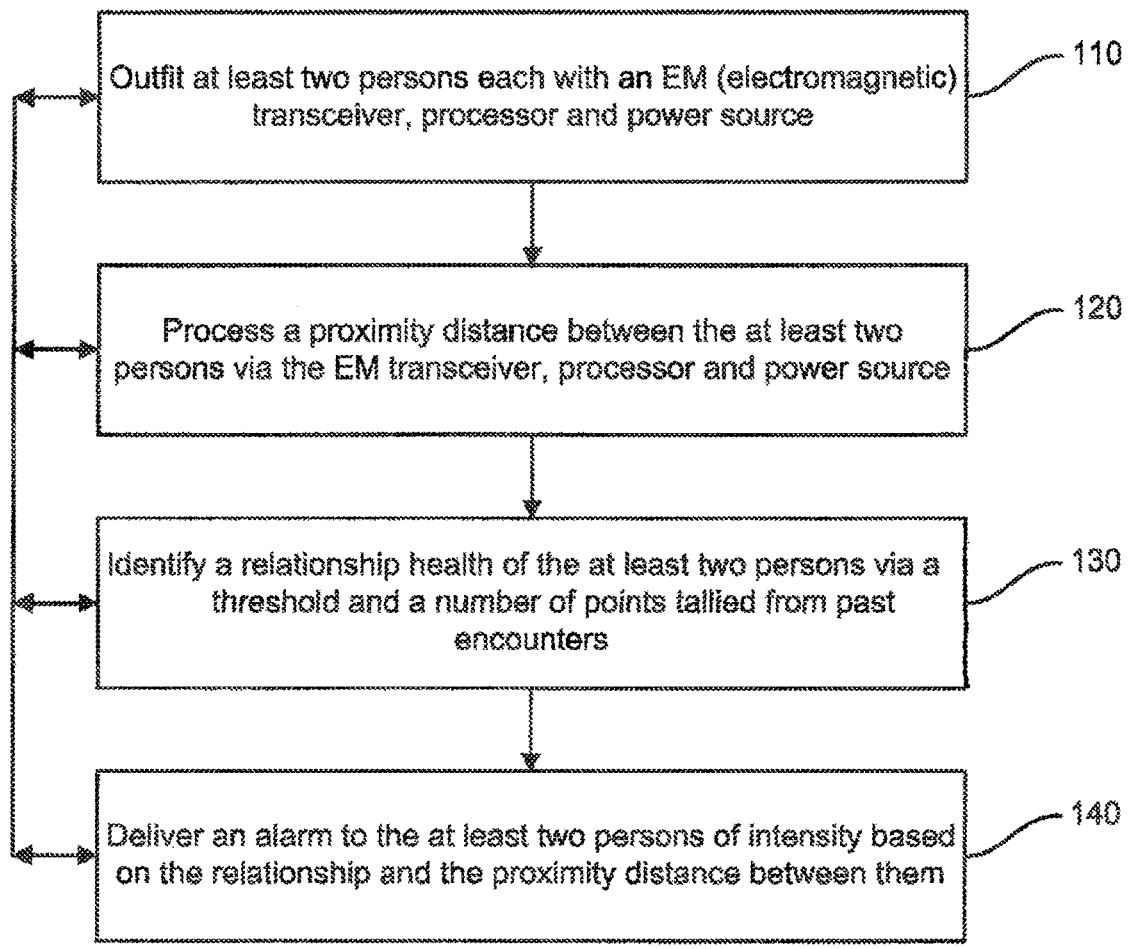
FIG. 2 is a block diagram of steps for use of the bracelets in accordance with an embodiment of the present disclosure.

FIG. 2 is a block diagram of steps for use of the bracelets in accordance with an embodiment of the present disclosure. The steps 110 through are inclusive of the block diagram disclosed.

Figure 3:
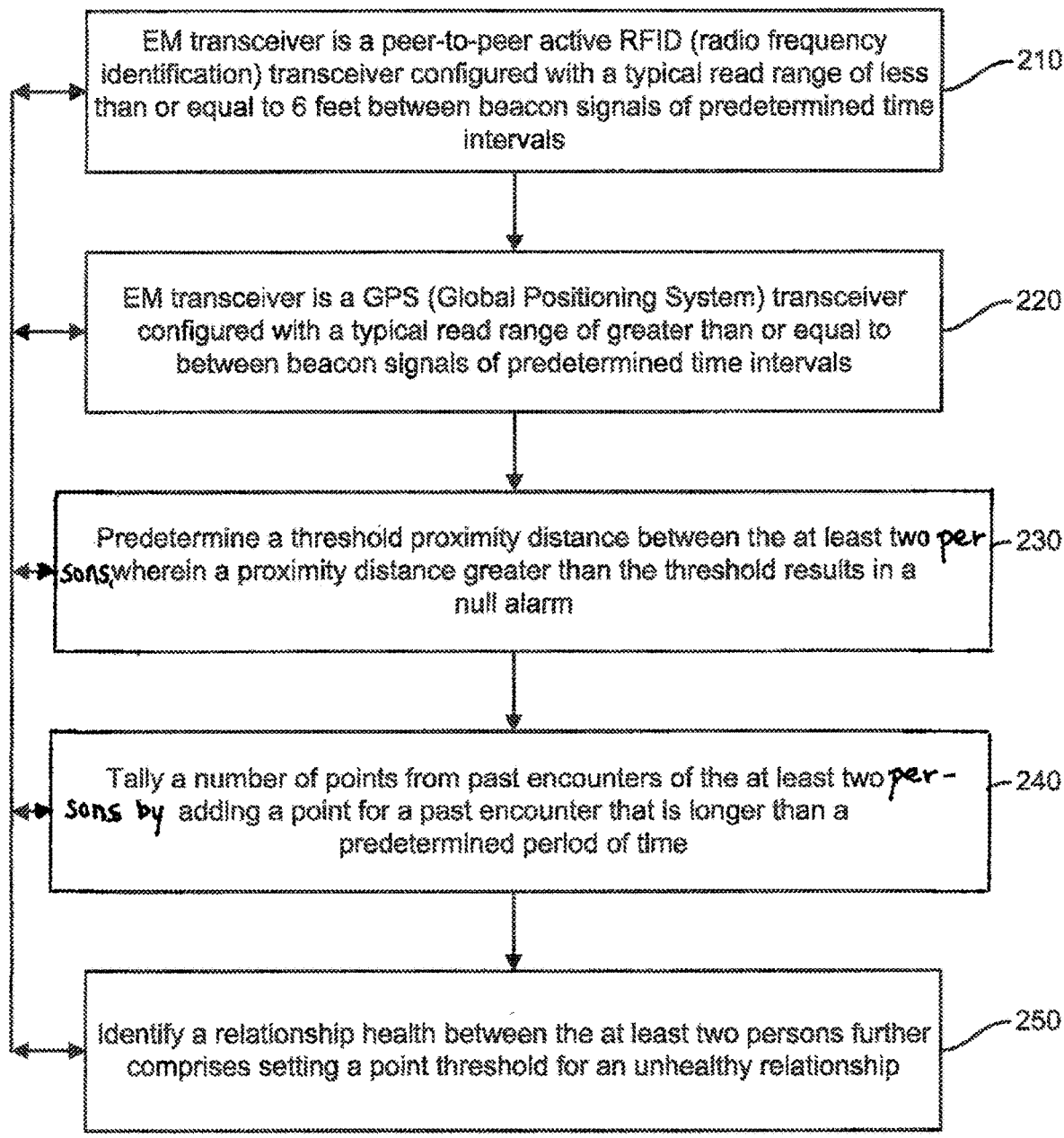
FIG. 3 is a block diagram of determining the health relationship of users of the bracelets in accordance with an embodiment of the present disclosure.

FIG. 3 is a block diagram of determining the health relationship of users of the bracelets in accordance with an embodiment of the present disclosure. The steps 210 through 250 are inclusive of the block diagram disclosed herein.

Figure 4:
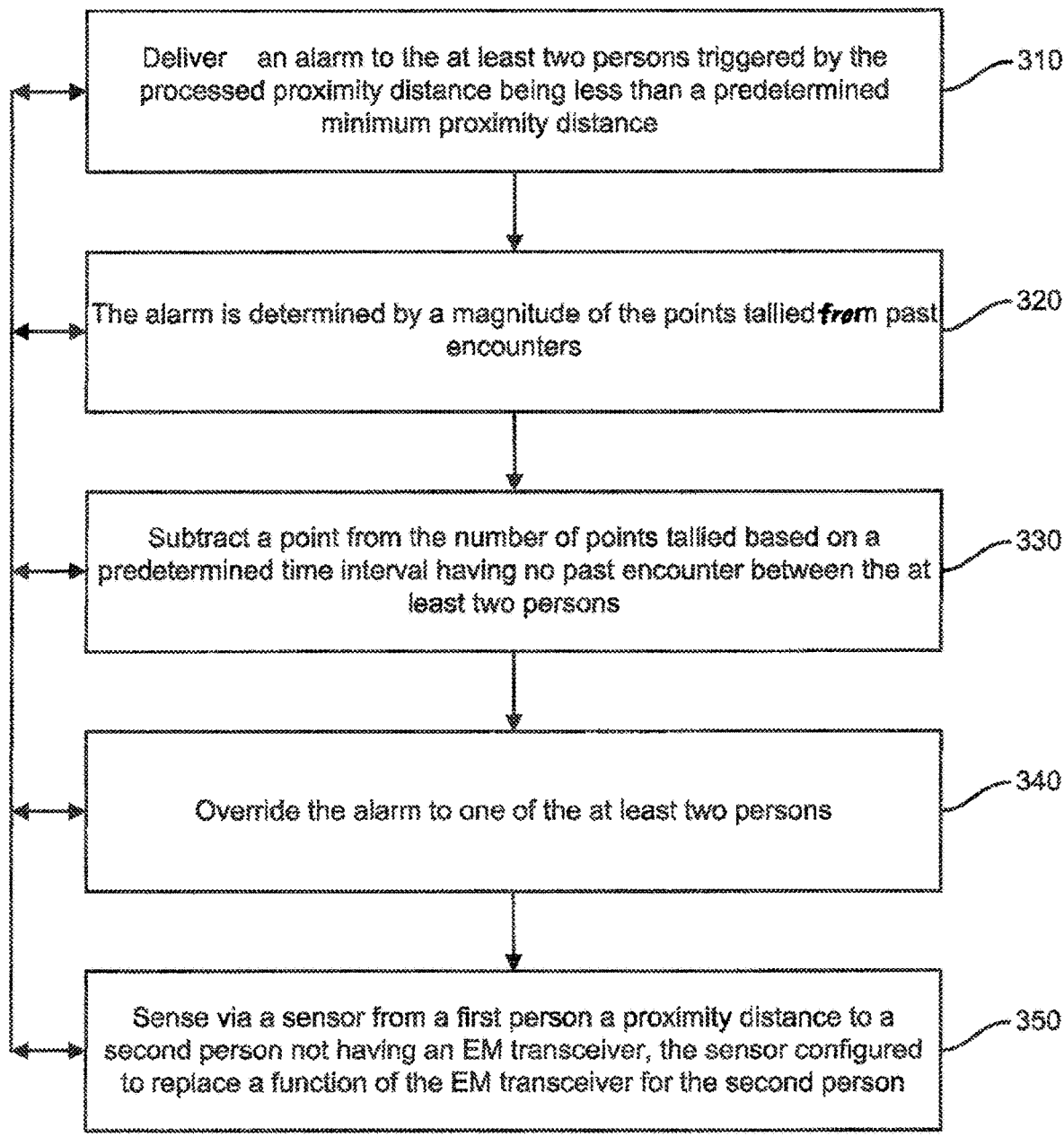
FIG. 4 is a block diagram of an alarm for users of the bracelets in accordance with an embodiment of the present disclosure.

FIG. 4 is a block diagram of an alarm for users of the bracelets in accordance with an embodiment of the present disclosure. The blocks 310 through 350 are inclusive of the block diagram disclosed herewith.

Figure 5:
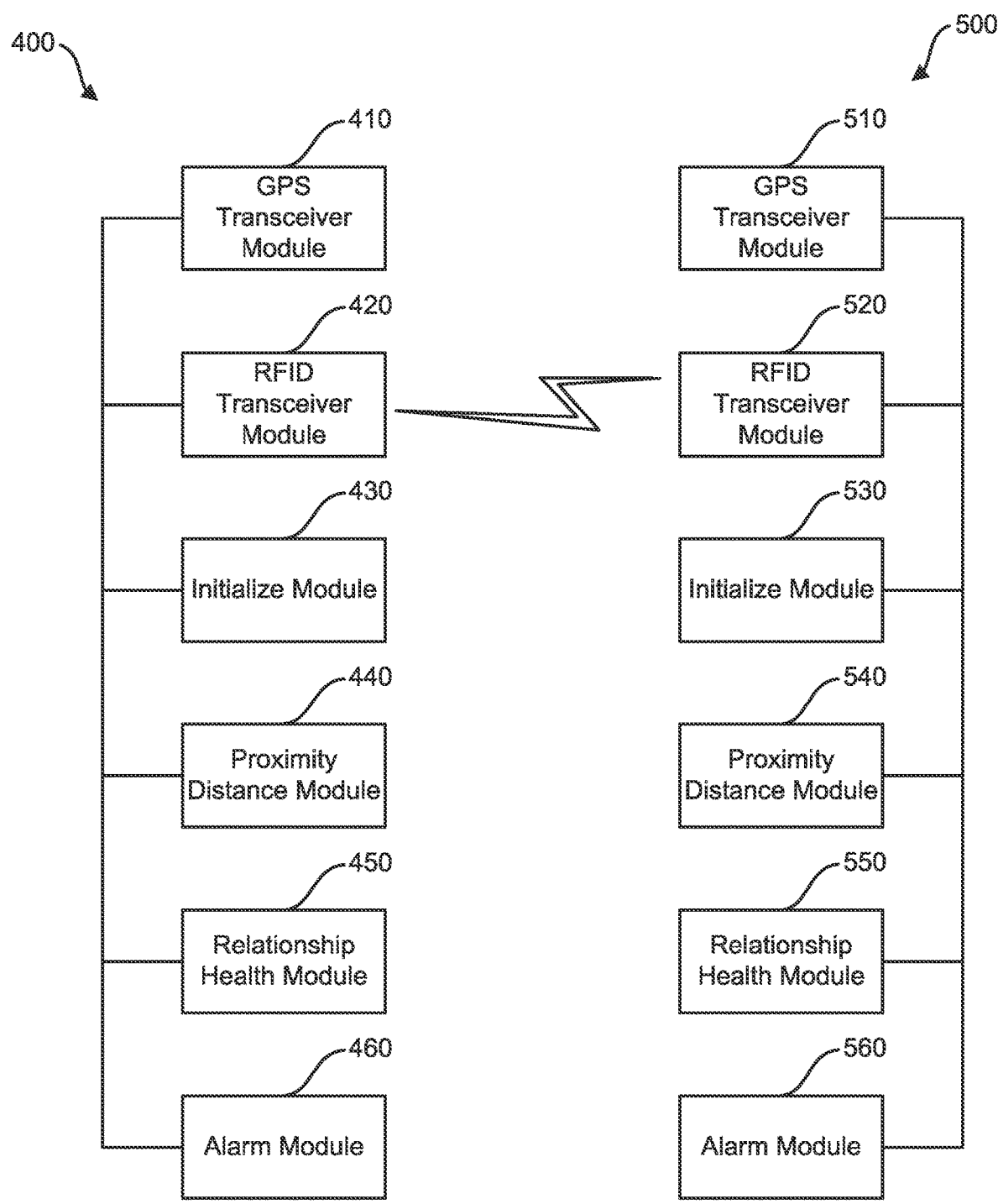
FIG. 5 is a block diagram of components of the bracelets in accordance with an embodiment of the present disclosure.

FIG. 5 is a block diagram of components of the bracelets in accordance with an embodiment of the present disclosure. The blocks 410 through 460 are components of the first bracelet 10 and the blocks 510 through 560 are components of the second bracelet 20 as shown in the respective figure and disclosed herein. Interaction there between is indicated by a wireless transmission.

Figure 6:
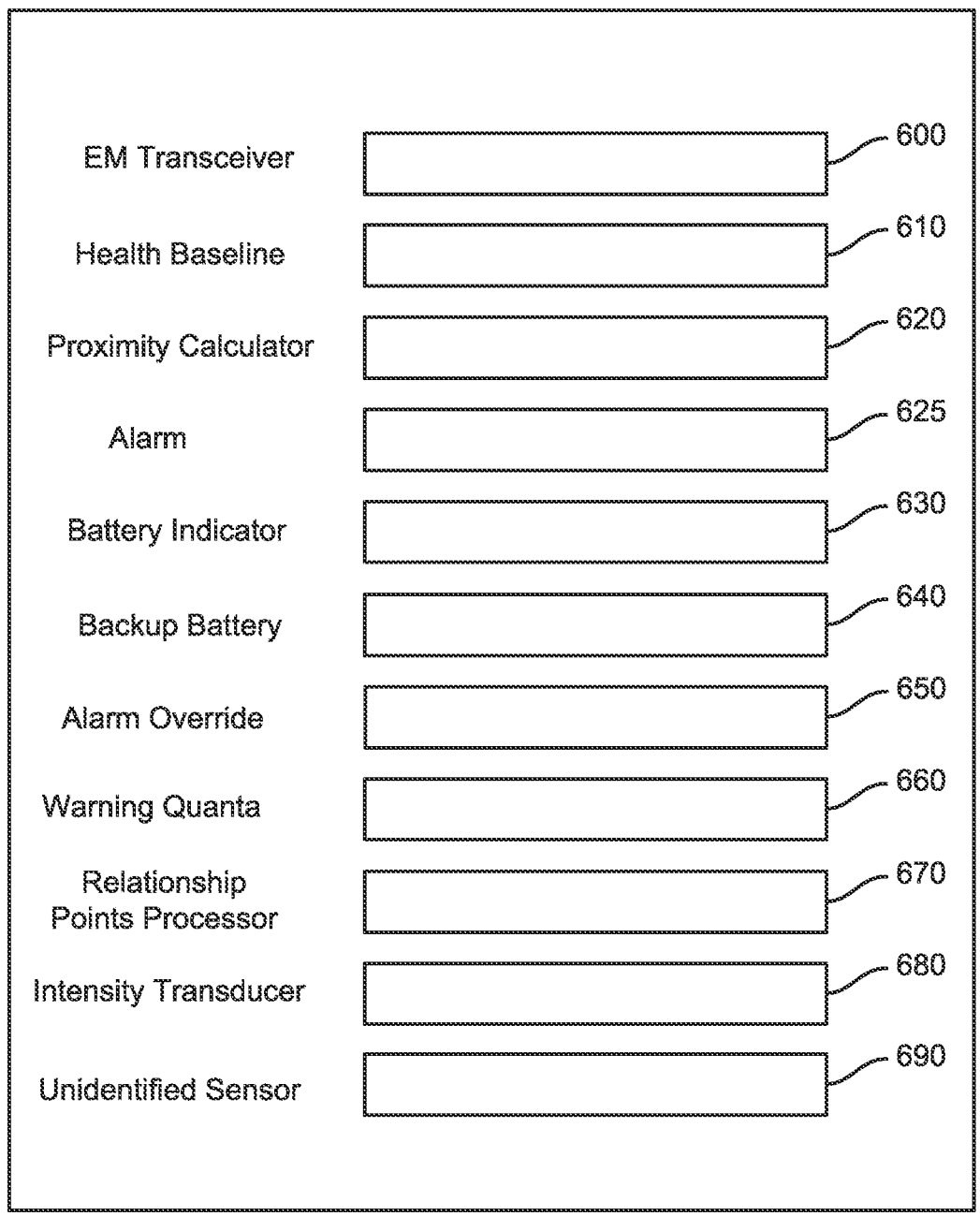
FIG. 6 is a block diagram of system components in accordance with an embodiment of the present disclosure.

FIG. 6 is a block diagram of system components in accordance with an embodiment of the present disclosure. Blocks 600 through 690 are inclusive of the respective figure attached herewith.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A method, comprising:
    a) outfitting at least two people each with an EM (electromagnetic) transceiver, processor and power source;
    b) processing a proximity distance between the at least two people via the EM transceiver, processor and power source;
    c) identifying a health relationship between the at least two people within the proximity distance via a vaccination and booster QR code and setting a point threshold for an unhealthy relationship;
    d) delivering an alarm to the at least two people of intensity based on the health relationship and the proximity distance between the at least two people; and
    e) tallying a number of points from past encounters of the at least two people by adding a point for a past encounter that is longer than a predetermined period of time.

2. The method of claim 1, wherein the EM transceiver is a peer-to-peer active RFID (radio frequency identification) transceiver configured with a typical read range of less than or equal to six feet between beacon signals of predetermined time intervals.

3. The method of claim 1, wherein the EM transceiver is a GPS (Global Positioning System) transceiver configured with a typical read range of greater than or equal to six feet between beacon signals of predetermined time intervals.

4. The method of claim 1, further comprising predetermining a threshold proximity distance between the at least two people wherein a proximity distance greater than the threshold results in a null delivered alarm.

5. The method of claim 1, wherein the alarm is a pulse vibration known to be unpleasant and deterring.

6. The method of claim 1, wherein the power source comprises a battery and a backup battery.

7. The method of claim 1, wherein processing a proximity distance comprises multiplying a signal travel time between respective EM transceivers by a travel speed of a radio wave carrying the signal.

8. The method of claim 1, wherein processing a proximity distance comprises a GPS calculated distance between the two respective EM transceivers.

9. The method of claim 1, wherein delivering the alarm to the at least two people is triggered by the processed proximity distance being less than a predetermined minimum proximity distance.

10. The method of claim 1, further comprising determining the alarm based on a magnitude of the points tallied from past encounters.

11. The method of claim 1, wherein the alarm is preset to a quantized range according to a quantized proximity distance.

12. The method of claim 1, further comprising subtracting a point from the number of points tallied based on a predetermined time interval having no past encounter between the at least two persons.

13. The method of claim 1, further comprising overriding the alarm delivered to one of the at least two people.

14. A non-transitory computer readable medium having computer useable program code executable to perform operations for personal health via a vaccination and booster QR code, the operations of the computer readable medium comprising:
    a) initializing an EM (electromagnetic) transceiver, processor and power source for at least two persons;
    b) processing a proximity distance between the at least two persons via the EM transceiver, processor and power source;
    c) identifying a health relationship of the at least two persons via a threshold and a number of points tallied from past encounters; and
    d) delivering an alarm to the at least two persons of intensity based on the health relationship and the proximity distance between them.

15. The non-transitory computer readable medium of claim 14, further comprising a non-transitory cell phone readable medium wherein operations of the cell phone readable medium reside on at least one cell phone.

16. A system for personal health, comprising:
    a) a module configured to initialize an EM (electromagnetic) transceiver, processor and power source for each of at least two persons;
    b) a module configured to process a proximity distance between the at least two persons via the EM transceiver, processor and power source;
    c) a module configured to identify a health relationship of the at least two persons via a threshold and a number of points tallied from past encounters; and
    d) a module configured to deliver an alarm to the at least two persons of intensity based on the health relationship and the proximity distance between them.

* * * * *